Patented Apr. 25, 1939

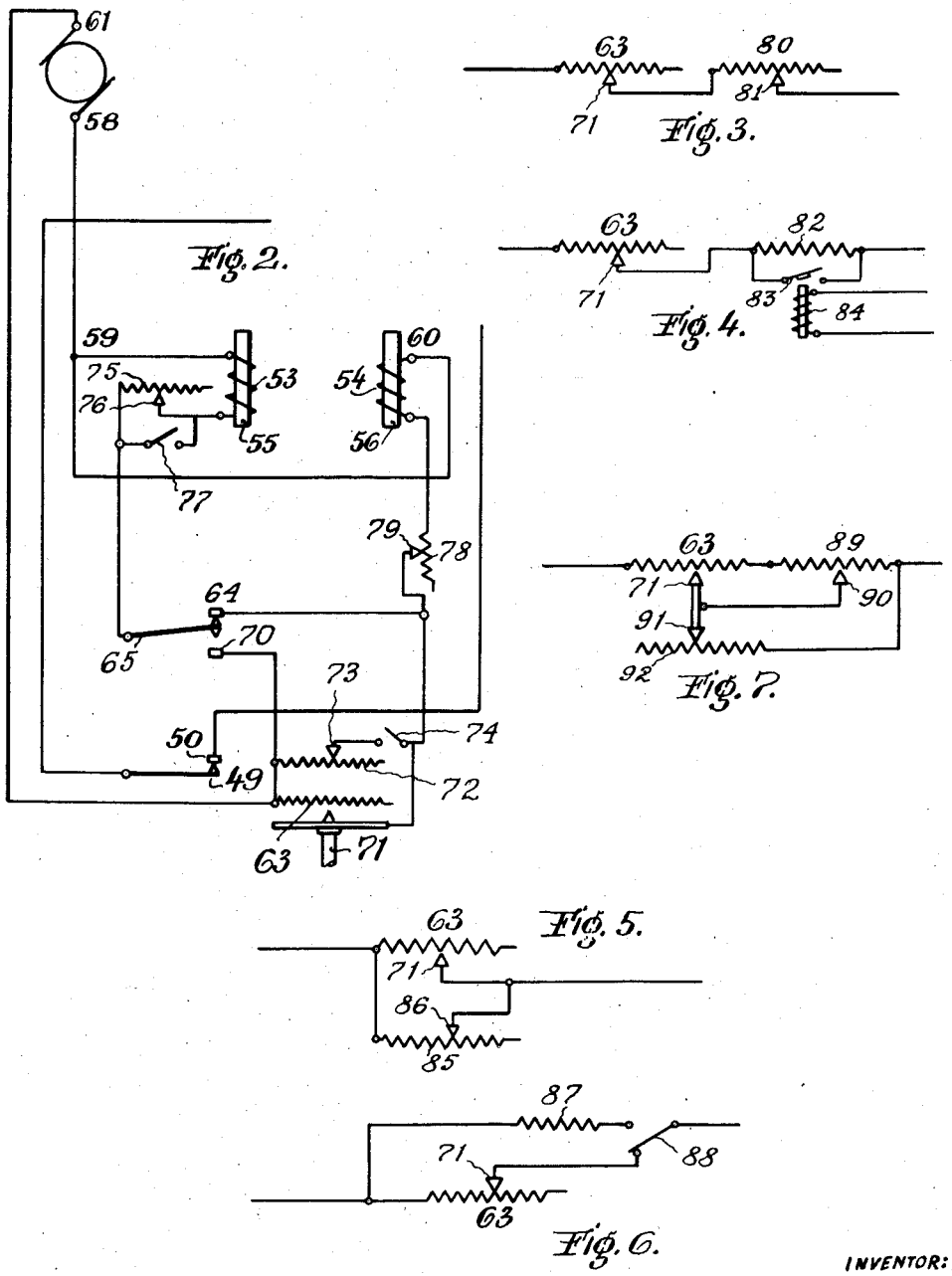

2,155,586

UNITED STATES PATENT OFFICE 2,155,586

ARRANGEMENT FOR AUTOMATICALLY REGULATING THE PITCH OF VARIABLE PITCH PROPELLERS

Heinrich Ebert, Frankfort-on-the-Main, Germany, assignor to Vereinigte Deutsche Metallwerke Aktiengesellschaft, Frankfort-on-the-Main, Heddernheim, Germany, a corporation of Germany Application October 15, 1936, Serial No. 105,729
In Germany October 17, 1935

5 Claims. (Cl. 170—135.6)

This invention relates to an arrangement for automatically regulating the pitch of variable pitch propellers with the aid of a source of supply of electric current dependent upon the speed of the propeller.

Pitch-adjusting arrangements in which the voltage of the current produced by the generator acts in dependence on the propeller speed, in fact in almost proportional relationship to the latter, on a voltage switch which effects an adjustment of the pitch of the propeller blades, are known per se. In such arrangements the speed of the propeller is determined or regulated, independently of flying conditions and of the position of the throttle control lever, with the aid of a hand lever which stresses an adjusting spring to a greater or less extent by controlling the current supplied to the electrical regulating member by the tension of the spring and by a magnet. The adjusting member itself can be an electro-magnetic brake or an eddy current brake, or also gearing having the same effect. The adjusting member may also be an electric motor disposed on the propeller itself or on the housing of the aircraft or vehicle engine.

The automatic regulating arrangement of the present invention differs from known arrangements of the foregoing kind, in the first place, by the fact that the adjustment to the desired speed is not made dependent upon the more or less heavy stressing of a spring, but that the current produced by the generator is fed by way of an adjustable resistance, which determines the pitch of the blades, to one or more voltage switches which control the external current for the actual regulating member in the required manner by way of magnetic switches or the like.

The arrangement of the present invention not only renders it possible to dispense with the per se very unreliable and moreover narrowly restricted adjustability of a small and sensitive spring, but it also permits a far more reliable and finer adjustment and regulation of the blade pitch. Moreover the invention ensures complete foolproofness, since all circuits are in a certain sense dependent on each other and moreover can be taken through a per se known limiting switch. The operating gear can also be simplified since it is possible to couple in convenient manner the control lever of the aircraft or vehicle engine (throttle control lever) with the adjusting device of the resistance or resistances, and at the same time by means of the throttle lever at its end positions to switch various circuits on or off or to switch over from one to another. In general, the fundamental arrangement of the invention provides possibilities of simple and foolproof operation of the adjusting device, all of which cannot be exhaustively dealt with in the typical embodiment thereof which will hereinafter be described. At the same time the whole regulating arrangement can be mounted, in the form of a small enclosed apparatus, in any convenient part of the aircraft or vehicle.

In order more clearly to understand the invention, reference is made to the accompanying drawings which illustrate diagrammatically and by way of example a few embodiments thereof.

In the drawings:

Fig. 2 depicts a similar view, somewhat fragmentary in character, of a modified embodiment of the present invention;

Fig. 3 shows the series connection of two rheostats for adjusting the pitch of the propeller;

Fig. 4 illustrates a pair of rheostates for the control device of the invention, one of which may be short-circuited by means of an electrically actuated contact;

Fig. 5 depicts the parallel connection of two rheostats for the same purpose;

Fig. 6 shows the parallel connection of a rheostat and of a fixed resistance which may be selectively connected by means of a switch; and Fig. 7 is a circuit constituted of three rheostats of which two are connected in parallel and the third is connected in series with the former.

Figure 1:
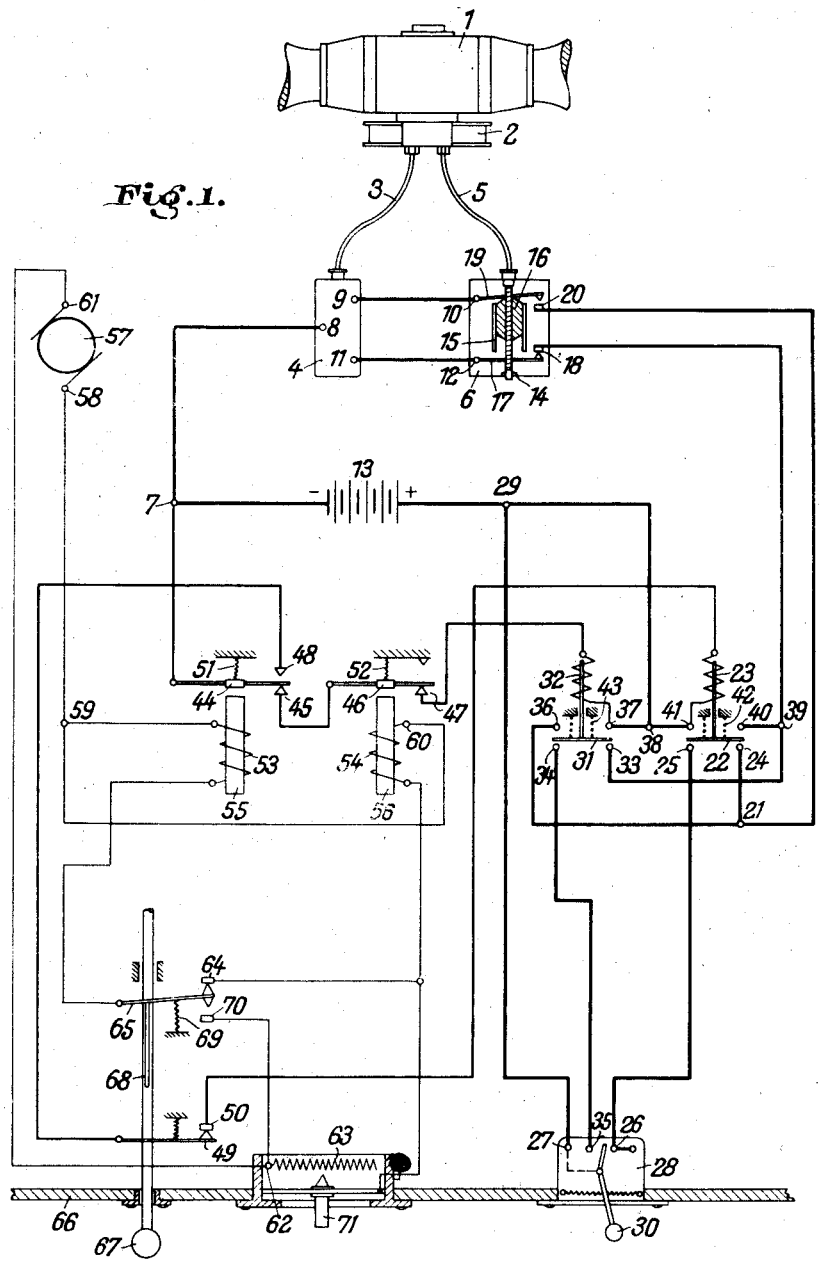
Fig. 1 illustrates a diagrammatic view of a preferred embodiment of the present invention.

In the embodiment shown in Fig. 1, it has been assumed that the engine is running at full throttle, that is to say that the throttle control lever which is denoted by the reference numeral 67, is in its most advanced position.

The adjusting member acting on the variable pitch propeller 1 or its gearing 2 is an electric motor 4 capable of rotating in either sense, which transmits the necessary adjusting movements to the gearing 2 by way of a flexible shaft 3. The electric motor is energised for example from an accumulator 13 through leads 7, 8 and 9, 10 and 11, 12, in such a way that the lead 9, 10 effects a rotation of the motor having the effect of an enlargement of the pitch, i. e. a decrease of the speed of revolution of the propeller, and the lead 11, 12 brings about a decrease of the pitch, i. e. an increase of the speed of revolution. These circuits are taken through a per se known limiting switch 6, which limits the pitch of the propeller in the limits between the starting and climbing position, which limiting switch in the present case is connected by a flexible shaft 5 to the gearing 2.

In the drawings four circuits in all can be distinguished, which can be closed partly in consequence of the automatic regulation and partly by manual operation, and which are as follows:

1. A main circuit which proceeds from the accumulator 13 through the lead 7, 8 of the electric motor, through the lead 9, 10, 20 of the limiting switch, through the branching point 21, and back to the accumulator terminal 29 through the contacts 24, 25 connected by the bridge 22 of the magnetic switch 23, and the terminals 26, 27 of the manually operable switch 28. As can be seen, this circuit can be opened and closed by the switch arm 30, which corresponds to manual adjustment to pitch enlargement.

2. A main circuit which proceeds from the accumulator 13 through the terminals 8, 11 of the electric motor, the lead 12, 18 of the limiting switch, through the bridge 31 of the magnetic switch 32, the contacts 33, 34, and the terminals 35, 37 of the manually operable switch 30 back to the accumulator terminal 29. This circuit can thus also be opened and closed by the switch 30 and, in contrast to the previous circuit, serves to effect a decrease of the pitch of the propeller, which corresponds to an increase in the speed of the propeller.

3. A main circuit as described for circuit 1, which however, instead of passing through the switch 28, traverses the magnetic switch 32 with the bridge 31, and the contacts 36, 37, returning to the terminal 29. In the drawings, this circuit is shown as interrupted between the terminals 36, 37. Said circuit is also used for the increasing of the pitch i. e. reducing the speed of the propeller.

4. A main circuit as described for circuit 2, which instead of traversing the switch 28, passes through the magnetic switch 23 by way of the bridge 22 directly back to the terminal 29 through the contacts 40, 41. This circuit is likewise shown as interrupted between the terminals 40 and 41 and it is used for reducing the pitch, i. e. for increasing the speed of the propeller.

From the wiring diagram it is apparent that an alteration of the pitch can be effected manually only when the bridges 22 and 31 of the magnetic switches 23 and 32 connect the terminals 24 and 25 or 33 and 34 respectively. Otherwise the propeller is adjusted by these main circuits only when the bridges 22 and 31 connect through their respective magnet the contacts 40 and 41 or 36 and 37, against the action of the springs 42 and 43 respectively. The magnetic switch 32 is operated only when the circuit from the terminal 7 through the voltage switches 53 and 54, i. e. through the spring bridges 44, 46, is closed. Similarly the magnetic switch 23 is operated only when the circuit can return from the terminal 7 to the accumulator terminal 29 by way of the spring contact 44 of the voltage switch 53 through the contact 48 and contact spring 49, 50. The said voltage switches are therefore operated in part by the force of their springs 51 and 52 respectively, and in part by the force of their magnet coils 53 and 54 respectively.

The magnet coils are excited by a generator 57, the speed and thus also the voltage of which is dependent upon the speed of the engine or propeller. In accordance with the invention the leads 58, 59 or 60 and 61, 62 of the generator 57 incorporate a rheostat 63. The subsidiary lead branching off from the contact 50 for the coil 53 passes through the contact spring 65 either by way of the contact 70 directly back to the generator 57 or, passes back to the generator by way of the contact 64 and coil 54 for the voltage switch having spring contact 46. The latter circuit is, however closed only when the engine control lever 67 is in the full throttle position, so that said lever through its catch 68 makes contact between 64 and 65 against the action of a spring 69.

If the throttle lever 67 is drawn back a little, the generator current traversing the coil 53 is returned direct through the contact 70, the rheostat 63 being thus cut out. In the wiring diagram illustrated, however, the two magnetic coils 53 and 54 are connected through the rheostat. A relatively high voltage i. e. a high speed of rotation, is therefore required in order to bring the magnetic switches into operation against the forces of the springs 51 and 52. The regulating equipment is thus adjusted to "high speed", namely for use when the aircraft or vehicle engine is at full throttle. If the speed of the propeller then falls, i. e. if the engine speed does not attain the speed set by the rheostat 63, the circuit will be closed for the magnetic switch 23 through the contact 44 and 48, the bridge 22 will be raised, so that the contacts 40 and 41 are thus connected, and the circuit for the adjusting motor 4 is completed through the lead 11, 12, 18, 39. The pitch of the propeller is thus diminished and its speed increases until such time as the magnetic action is again sufficient to interrupt the contact between 44 and 48. At the same moment the bridge 22 drops on to the contacts 24, 25 again, and the previous circuit is interrupted, so that the adjustment of the screw ceases. The screw therefore turns at the speed set by the rheostat 63. If, for any reason, the speed of the propeller increases, so that the voltage of the generator 57 also increases, both spring contacts 44 and 46 are attracted by the voltage switch coils 53 and 54, and the circuit passing through the magnetic switch 32 is closed through the contacts 45 and 47. The bridge 31 is raised and connection is made between contacts 36 and 37, so that the adjusting motor 4 now is set to an increase of the pitch, i. e. a decrease of the speed, through its circuit 9, 19, 20, 21.

As will be evident from the foregoing description, when the propeller turns at the set speed, the spring contact 44 oscillates between the contacts 45 and 48, while the spring contact 46 reacts according to its adjustment—which if desired may be effected by a small regulating resistance—to more or less early response. It is obvious that the movement of the knob 71, i. e. the adjustment of the rheostat 63, can be effected even during flight to correspond to any desired propeller speed.

A further feature of the invention is the connection of the throttle control lever 67 to the contact 65, 64 or 70. If the engine is throttled down slightly, contact is made between 65 and 70. The voltage switch 54 receives its current through the adjusted resistance 63, while the voltage switch 53 is connected direct to the generator without the interposition of a resistance or if desired, only a small adjustable regulating resistance. The voltage switch 53 therefore responds even to small voltages, i. e. it is set for "low speeds". Low speeds, however, can be adjusted only through the magnetic switch 23, i. e. the "low speed" set must be attained, while any increase in speed is at once possible since the current traversing the magnetic switch 32 must also be passed through the spring contact 46, 47. The latter is, however, brought into operation only at a higher speed corresponding to the interposed rheostat 63.

Thus the speed of the engine can vary within wide limits without the automatic regulation being brought into action. The automatic regulation is applied only when the engine speed varies above or below the adjusted limits. These limits can of course be determined by suitable slide resistances or the like, if desired with the aid of calibrated scales. The accompanying drawings show this possibility of variation for higher speeds. Within the large range of speeds afforded by the automatic regulation, the regulating device is cut out, but it is at once brought into action as soon as the maximum or minimum permissible speed corresponding to the setting is exceeded or not attained. In general, however, these limits are not exceeded in the case of the alteration of the speeds in consequence of alterations in flying speeds, except in the case of a dive or when supercharged engines are used. The described arrangement is particularly useful for dives. When changing into the dive, i. e. on throttling the engine down, it is the speed of the propeller, and in no circumstances the pitch of the propeller, which must first be reduced. In order, moreover, to control the substantially more rapid picking up of speed of revolution, as the flying speed in the dive increases, with normal small adjustment speeds in respect of the non-exceeding of the maximum permissible speed of revolution, the variation of the speed, can, as hereinbefore indicated, be set at a lower level through a slide resistance, in such a way that despite the regulated speed having been exceeded in this exceptional case the maximum permissible speed is not exceeded.

Conversely, when coming out of a dive into a climb, it is possible to set the lower revolution limit correspondingly slightly higher. For certain conditions of flight this can of course also be done with previously adjusted resistances; it can be done in convenient manner by the provision of switches which when put in the "cruising" or "dive" positions make the necessary contacts. Within the large range of propeller speeds thus limited, manual adjustment is possible and may in certain cases be very desirable. In order then to eliminate incorrect operation, i. e. in order to prevent the maximum or minimum permissible speed from being exceeded or not being attained, the main circuit is passed from the magnetic switch 23 through the manually operable switch 28. If, for example, the propeller, which rotates at a certain speed within the large range of revolutions, were set by the hand switch lever 30 to "small pitch", current would be supplied to the adjusting motor 4 through the contact 34, bridge 31 and contact 33, and the speed would be increased until the contact springs 44 and 46 bring the magnetic switch 32 into action; the bridge 31 would thereby be raised and thus the manual adjustment would be disconnected. When the switch is placed in the "large pitch" position, the speed will similarly be reduced through the contacts 25, 24 and the bridge 22 only until the spring contact 44 acts in accordance with the set speed and operates the magnetic switch 32 so as to effect an interruption of the main circuit. Foolproof operation is thus ensured in this case also.

The regulating arrangement of the present invention thus provides possibilities which enable the most diverse effects to be obtained and the most diverse operations to be performed in simple manner. Thus it is possible to provide, instead of one regulatable or adjustable resistance 63, a plurality of such resistances connected in series or in parallel, and also to provide a larger number of voltage switches in the same way, according to the operations to be performed.

Referring now more particularly to Fig. 2 of the drawings, a modified embodiment of the invention is illustrated. It will be noted that the arrangement depicted in Fig. 2 is much similar to that of Fig. 1 with the difference, however, that only some of the more essential elements are shown, such as the generator having leads 58 and 61, voltage switch coils 53 and 54, contacts 49, 50, 64, 65 and 70 actuable by the throttle control lever, and rheostat 63, 71. In addition to these elements, an additional resistance 72 is provided which is adjustable by means of a sliding contact 73 and may be connected across rheostat 63, 71 by means of a switch 74. Thus, additional resistance 72 may be previously adjusted by means of sliding contact 73 and may be instantaneously connected in the circuit by means of switch 74 to regulate the highest permissible number of revolutions obtainable with resistance 63. Likewise, a resistance 75 adjustable by means of a sliding contact 76 is connected in series with voltage switch coil 53, and may be short-circuited by means of a switch 77. The object of this modification is to shift the lowest limit of the revolutions in the upward direction for the transition from diving to climbing. As has been pointed out in the foregoing, this resistance may be present for certain conditions of flying, and may be connected to or disconnected from the circuit by means of its associated switch according to whether the conditions of cruising or of diving prevail. A resistance 78 which is adjustable by means of a sliding contact 79 is connected in series with voltage switch coil 54 in order to compensate for the slight differences in the voltage switches and in the leads.

In Figs. 3 to 7 various possibilities are shown for connecting a plurality of adjustable resistances with each other. In all of these figures, the rheostat bears the reference characters 63, 71, as in Figs. 1 and 2.

Fig. 3 illustrates the series connection of rheostat 63, 71 with a resistance 80, which is adjustable by means of a sliding contact 81. Fig. 4 depicts a similar series connection of a resistance 82 with the rheostat 63, 71. Resistance 82 may be short-circuited by means of a contact arm 83, actuable by electromagnet 84.

Fig. 5 shows the parallel connection of rheostat 63, 71 with a resistance 85, which is adjustable by means of a sliding contact 86. Fig. 6 is a similar circuit in which a fixed resistance 87 may be connected across rheostat 63, 71 by means of a switch 88. Thus, when it is desired to obtain a predetermined number of revolutions of the propeller, rheostat 63, 71 may be disconnected and fixed resistance 87 corresponding to such predetermined number of revolutions may be connected.

Fig. 7 illustrates the combination of three rheostats into a series-parallel arrangement. As will be readily observed from the drawings, resistances 63 and 89 are connected in series with each other, and a third resistance 92 is connected across the operative portion of said resistances. Resistances 63, 89 and 92 are provided with sliding contacts 71, 90 and 91, respectively, of which 71 and 91 are operated simultaneously and are connected to sliding contact 90. Thus, at all times, the operative portions of resistances 89 and 92 are connected in parallel with each other, and in series with the operative portion of resistance 63.

In conclusion brief reference will also be made to the possibility of dropping below the limit of speed, if necessary. This applies particularly to landing with the engine completely throttled down. For this eventuality a spring-constrained switch 49, 50 is provided, which is so coupled to the throttle lever 67—for example through the stop or catch 68—that in the idling position the throttle lever simultaneously opens the switch 49, 50. Automatic adjustment to "small pitch" is thus impossible; the speed of the propeller must therefore in this case decrease as in the case of a non-controllable propeller. The adjustment to "gliding position", which is required only with the engine out of action, is also possible only when the throttle control lever is in the idling position, since thereby the contacts 24, 25 remain connected by the bridge 22 through the cutting out of the magnetic switch 23. By the operation of the limiting switch 6, the adjustment of the screw beyond the gliding position and below starting position is avoided. This latter point is important in connection with the hereindescribed regulating device when the throttle control lever is not in the idling position and the engine has stopped, because otherwise the propeller will constantly be turned in such a way as to bring about a reduction of the pitch. On the other hand, with the aid of the limiting switch, the screw can only adjust itself to the starting position, i. e. the smallest necessary pitch, and no farther.

I claim:

1. In a system for automatically regulating the pitch of variable pitch propellers, the combination comprising a propeller having blades of adjustable pitch, an electrically operable regulating member for increasing and decreasing said pitch, a variable source of electric current having a voltage dependent upon the speed of the propeller, a constant source of current, magnetic switches adapted to be actuated by said constant source of current to operate said regulating member, at least one voltage switch responsive to said variable source of current to actuate said magnetic switches, and an adjustable resistance intermediate to said variable source of current and said voltage switch for adjusting the speed at which operation of said switch is initiated.

2. In a system for automatically regulating the pitch of variable pitch propellers, the combination comprising a propeller having blades of adjustable pitch, an electrically operable regulating member for increasing and decreasing said pitch, a variable source of current having a voltage dependent upon the speed of the propeller, a constant source of current, magnetic switches adapted to be actuated by said constant source of current to operate said regulating member, at least one voltage switch responsive to said variable source of current to actuate said magnetic switches, an adjustable resistance intermediate to said variable source of current and said voltage switch for adjusting the speed at which operation of said switch is initiated, and a limiting switch actuated by the movement of the blades of said propeller and intermediate said constant source of current and said magnetic switches to maintain the variation of pitch within predetermined limits.

3. In a system for automatically regulating the pitch of variable pitch propellers, the combination comprising a propeller having blades of adjustable pitch, an electrically operable regulating member for increasing and decreasing said pitch, a generator supplying a current having a voltage dependent upon the speed of the propeller, a constant source of current, magnetic switches adapted to be actuated by said constant source of current to operate said regulating member, at least one voltage switch responsive to the voltage of said generator to actuate said magnetic switches, an adjustable resistance for adjusting the speed at which operation of said voltage switch is initiated, a limiting switch actuated by the movement of the blades of said propeller for maintaining the pitch of the propeller between predetermined limits, and manually operative elements for modifying the circuit controlled by said magnetic switches.

4. In a system for automatically regulating the pitch of variable pitch propellers, the combination comprising a propeller having blades of adjustable pitch, an electrically operable regulating member for increasing and decreasing said pitch, a generator supplying a current having a voltage dependent upon the speed of the propeller, a constant source of current, magnetic switches adapted to be actuated by said constant source of current to operate said regulating member, at least one voltage switch responsive to the voltage of said generator to actuate said magnetic switches, an adjustable resistance for adjusting the speed at which operation of said voltage switch is initiated, manually operative elements for modifying the circuit controlled by said magnetic switches, a throttle control lever associated with the engine driving said propeller, and switching means responsive to the position of said throttle control lever to modify the co-operation of said voltage and magnetic switches.

5. In a system for automatically regulating the pitch of variable pitch propellers, the combination comprising a propeller having blades of adjustable pitch, an electrically operable regulating member for increasing and decreasing said pitch, a generator supplying a current having a voltage dependent upon the speed of the propeller, a constant source of current, magnetic switches adapted to be actuated by said constant source of current to energize said regulating member, at least one voltage switch responsive to the voltage of said generator to actuate said magnetic switches, an adjustable resistance intermediate to said generator and said voltage switch to adjust the speed at which operation of said voltage switch is initiated, manually operative elements for modifying the circuit controlled by said magnetic switches, a throttle control lever associated with the engine driving said propeller, and switching means actuated by said throttle lever for disabling said adjustable resistance.

HEINRICH EBERT.